(12) United States Patent
Smith (10) Patent No.: US 7,002,950 B1
(45) Date of Patent: Feb. 21, 2006

(54) SYSTEMS AND METHODS IMPLEMENTING INTERNET SCREEN DIALING FOR CIRCUIT SWITCHED TELEPHONES

(75) Inventor: Robert Carlquist Smith, Lithia, FL (US)

(73) Assignees: Verizon Corporate Services Group Inc., New York, NY (US); Level 3 Communications, Inc., Broomfield, CO (US)

( * ) Notice: Subject to any disclaimer, the term of this patent is extended or adjusted under 35 U.S.C. 154(b) by 1009 days.

(21) Appl. No.: 09/694,593

(22) Filed: Oct. 23, 2000

Related U.S. Application Data (63) Continuation-in-part of application No. 09/620,484, filed on Jul. 20, 2000.

(51) Int. Cl.
*H04L 12/66* (2006.01)
(52) U.S. Cl. ....................... 370/352; 370/241
(58) Field of Classification Search ........ 370/352–354, 370/356, 241
See application file for complete search history.

(56) References Cited

U.S. PATENT DOCUMENTS

| | | | |
|---|---|---|---|
| 5,377,186 A | 12/1994 | Wegner et al. | |
| 5,905,724 A | 5/1999 | Carson et al. | |
| 5,987,482 A | 11/1999 | Bates et al. | |
| 6,052,411 A * | 4/2000 | Mueller et al. | 375/222 |
| 6,078,582 A * | 6/2000 | Curry et al. | 370/356 |
| 6,275,490 B1 * | 8/2001 | Mattaway et al. | 370/352 |
| 6,324,264 B1 * | 11/2001 | Wiener et al. | 379/88.22 |

* cited by examiner

*Primary Examiner*—Huy D. Vu
*Assistant Examiner*—Daniel Ryman
(74) *Attorney, Agent, or Firm*—Leonard C. Suchyta, Esq.; John Wall, Esq.

(57) ABSTRACT

A system includes a telephony device (152) and a computer (102) coupled to a telephone line (194). The computer (102) includes an input device (210) and a processor (205). The processor (205) receives an electronic document that includes data representing a telephone number. The processor (205) further receives input via the input device (210) selecting the telephone number from the electronic document. The processor (205) additionally signals, via a packet-switched network (135) coupled to the telephone line (194), a telecommunication system (145) to connect a call between a telephone (156) associated with the telephone number and the telephony device (152) in response to the selection of the telephone number, the call being connected via the telephone line (194).

41 Claims, 7 Drawing Sheets

SYSTEMS AND METHODS IMPLEMENTING INTERNET SCREEN DIALING FOR CIRCUIT SWITCHED TELEPHONES

The present application is a continuation-in-part of co-pending application Ser. No. 09/620,484, entitled "Systems and Methods Implementing Internet Screen Dialing for Circuit Switched Telephones" and filed on Jul. 20, 2000.

FIELD OF THE INVENTION

The present invention relates generally to systems and methods for setting up calls between telephones and, more particularly, to systems and methods implementing computer screen dialing for setting up calls between telephones in a telephony network.

BACKGROUND OF THE INVENTION

Conventional electronic mail (e-mail) and Hyper-text Markup Language (HTML) documents have become popular means for sending data across the Internet. These electronic documents often include contact information for persons or entities sending the documents. This contact information typically includes telephone numbers and address information, and can further include conventional web addresses or e-mail addresses in conventional hyper-text format. The hyper-text addresses permit a reader of the document to "click" on the bolded and underline hyper-text, using a conventional mouse, and immediately access a website associated with the hyper-text using a conventional web browser. Hyper-text additionally permits a reader of a document to "click" on hyper-text of e-mail addresses to quickly compose and send e-mail to the e-mail addresses contained in the hyper-text. Conventional hyper-text, therefore, permits quick and easy contact with persons and entities contained in electronic documents.

Electronic documents, however, also often contain telephone numbers associated with persons or entities that a reader may wish to contact. In contrast to the use of hyper-text links, a reader of an electronic document conventionally is required to manually enter a telephone number, contained in the electronic document, into a telephone to enable the reader to contact a person or entity associated with the telephone number.

Therefore, there exists a need for a system and method that, similar to hyper-text links for e-mail and web-site addresses, permit quick and easy establishment of a telephone call with a telephone associated with a telephone number contained in an electronic document, using a computer input device, such as a mouse.

SUMMARY OF THE INVENTION

Systems and methods consistent with the present invention address this and other needs by providing functionality within a computer that recognizes telephone numbers among characters entered into an electronic document and further permits a calling party to initiate a call with a party associated with the telephone number. Call initiation is achieved using a computer input device, such as a mouse, by positioning a pointer over a telephone number displayed in an electronic document and selecting the telephone number (e.g., "clicking" the mouse). After selection of the telephone number, the computer formulates a message containing the telephone number and a calling party number that can be used to establish a connection between a telephone associated with a calling party and a telephone associated with the telephone number of the called party.

In accordance with the purpose of the invention as embodied and broadly described herein, a method of making a telephone call using an electronic document stored in a computer includes retrieving an electronic document that includes data representing at least one telephone number; selecting a first telephone number from the electronic document; and signaling, from the computer via a packet-switched network coupled to a first line, a telecommunication system to connect a call between a first telephone associated with the first telephone number and a second telephone associated with a calling party telephone number in response to the selection of the first telephone number, the call being connected via the first line.

In another implementation consistent with the present invention, a method of making a telephone call using an electronic document stored in a computer includes retrieving an electronic document that includes data representing at least one telephone number; selecting a first telephone number from the electronic document; signaling, from the computer via a packet-switched network coupled to a first line, a telecommunication system to connect a call between the first telephone number and a calling party telephone number in response to the selection of the first telephone number; and establishing, via the first line, a circuit-switched connection between a first telephone associated with the first telephone number and a second telephone associated with the calling party telephone number.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods, consistent with the present invention, provide mechanisms that enable a calling party to initiate a call using a telephone number contained within an electronic document. Call initiation can be achieved, consistent with the present invention, using a computer input device, such as a mouse, through the positioning of a conventional pointer over a telephone number displayed in an electronic document and the selection by the input device (e.g., "clicking" the mouse). Selection of the telephone number initiates a process whereby a connection is established between a telephone associated with a calling party and a telephone associated with the telephone number of the called party.

Exemplary Network

Figure 1:
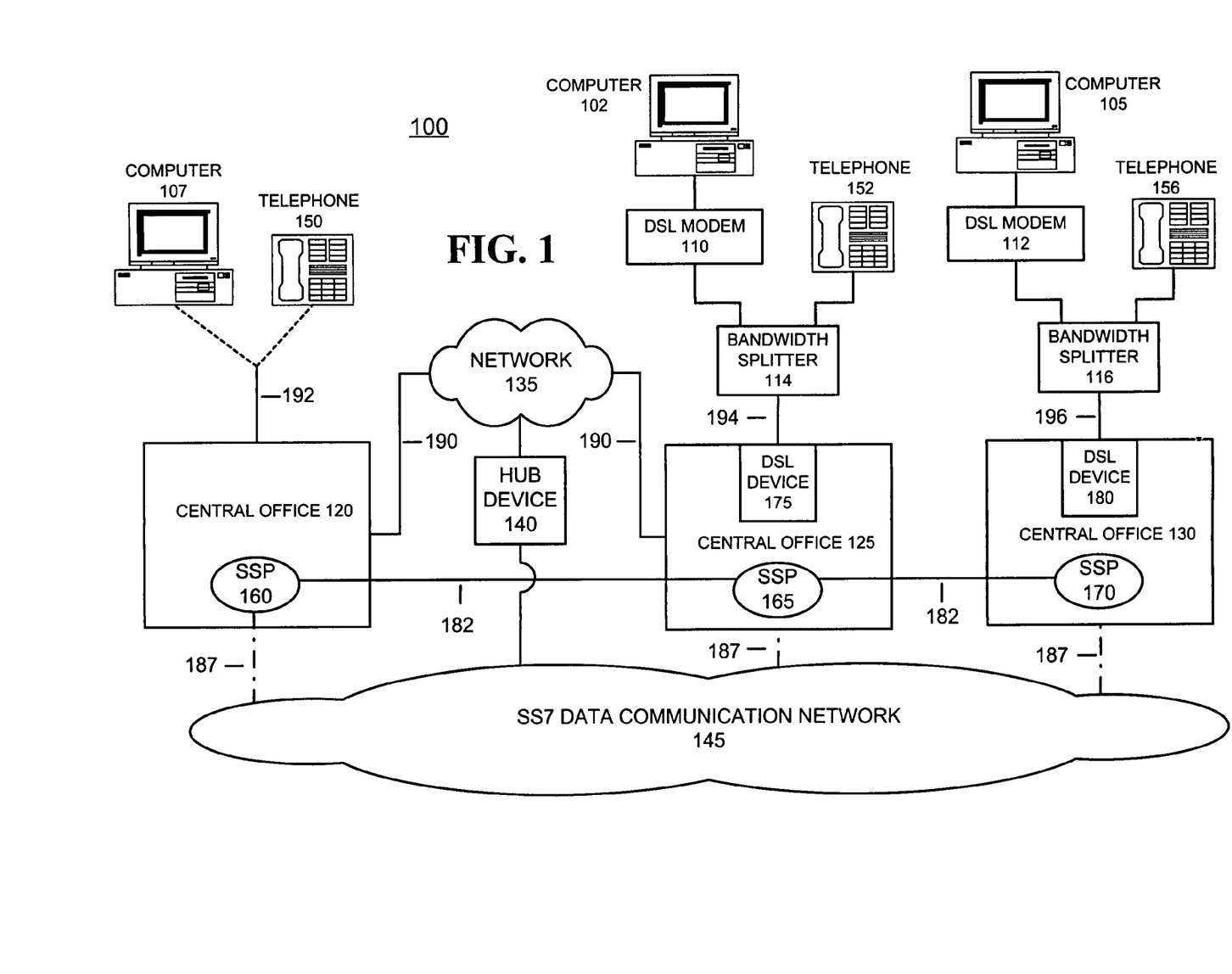
FIG. 1 illustrates an exemplary network in which a system and method, consistent with the present invention, may be implemented.

FIG. 1 illustrates an exemplary network 100 in which a system and method, consistent with the present invention, connects a telephone call using electronic documents received at a computer. Network 100 may include computers 102, 105 and 107; digital subscriber line (DSL) modems 110 and 112; bandwidth splitters 114 and 116; central offices 120, 125 and 130; network 135; hub device 140; a Signaling System Number 7 (SS7) data communication network 145; and telephones 150, 152 and 156. Telephones 150, 152 and 156 can include any type of conventional telephony devices known within the art. Central offices 120, 125 and 130 may include conventional service switching points (SSPs) 160, 165 and 170, respectively. Central offices 125 and 130 may further include conventional DSL devices 175 and 180, respectively.

Computer 102 may connect to DSL device 175 of central office 125 via DSL modem 110 and bandwidth splitter 114. DSL modem 110 can receive data from computer 102 and transmit the received data to bandwidth splitter 114 over a data frequency band. DSL modem 110 can further receive voice data from telephone 152 and transmit the received data to bandwidth splitter 114 over a voice frequency band. Bandwidth splitter 114 can combine data received over data and voice frequency bands for transmission to DSL device 175 via telephone line 194. Bandwidth splitter 114 can further separate voice band frequencies and data band frequencies received from DSL device 175 via telephone line 194.

Computer 105 may connect to DSL device 180 of central office 130 via DSL modem 112 and bandwidth splitter 116. DSL modem 112 can receive data from computer 105 and transmit the received data to bandwidth splitter 116 over a data frequency band. DSL modem 112 can further receive voice data from telephone 156 and transmit the received data to bandwidth splitter 116 over a voice frequency band. Bandwidth splitter 116 can combine data received over data and voice frequency bands for transmission to DSL device 180 via telephone line 196. Bandwidth splitter 116 can further separate voice band frequencies and data band frequencies received from DSL device 180 via telephone line 196.

Computer 107 and telephone 150 may alternately (e.g., not simultaneously) connect to central office 120 via telephone line 192.

Computers 102, 105 and 107 may connect to network 135 via links 190 and central offices 120, 125 and 130, respectively (link between central office 130 and network 135 not shown). Network 135 may include one or more packet-switched networks, including local area networks (LANs), metropolitan area networks (MANs), wide area networks (WANs), an intranet, or the Internet.

Hub device 140 can include a network node that receives and processes data packets from network 135. Hub device 140 can connect to network 135 and SS7 network 145 via wired, wireless or optical connection links.

SS7 network 145 can include a conventional network that uses SS7 signaling protocols for setting up telephone calls between SSPs 160, 165 and 170. Network 145 can include conventional service control points (SCPs) and signal transfer points (STP) for routing calls between SSPs.

SSPs 160, 165 and 170 can include conventional network nodes having SS7 messaging capability. SSPs 160, 165 and 170 connect with one another via links 182. Links 182 include circuits for connecting calls between telephones 150, 152 and 156. SSPs 160, 165 and 170 may be connected to SS7 network 145 via links 187.

Exemplary Computer

Figure 2:
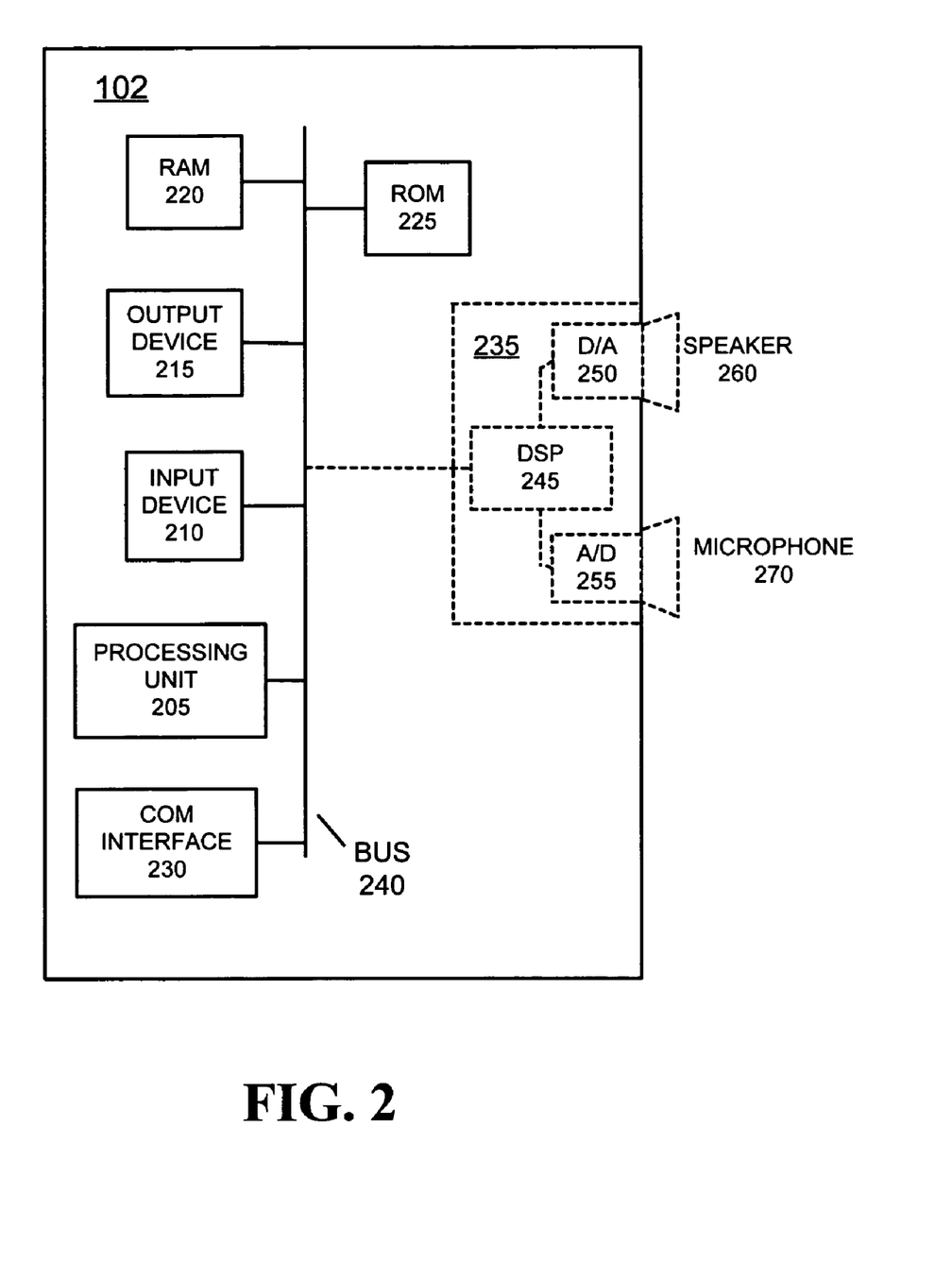
FIG. 2 illustrates exemplary components of a computer consistent with the present invention.

FIG. 2 illustrates an exemplary computer 102 in which a system and method, consistent with the present invention, may be implemented for assisting in the set-up of a call between telephones, such as telephones 152 and 156. Computer 102 may include a processing unit 205, an input device 210, an output device 215, a Random Access Memory (RAM) 220, a Read Only Memory (ROM) 225, a communication interface 230, an optional packetized telephone peripheral 235, and a bus 240.

Processing unit 205 may perform all data processing functions for inputting, outputting, and processing of data. Input device 210 permits entry of data into computer 102 and includes one or more user interfaces (not shown), such as a keyboard, a mouse or the like. Output device 215 permits the output of data in video, audio, or hard copy format.

RAM 220 provides semi-permanent working storage of data and instructions for use by processing unit 205. ROM 225 provides permanent or semi-permanent storage of data and instructions for use by processing unit 205. RAM 220 and ROM 225 may include large-capacity storage devices, such as a magnetic and/or optical recording medium and its corresponding drive. Communication interface 230 includes conventional mechanisms for connecting computer 102 to network 135. Bus 240 interconnects the various components of computer 102 to permit the components to communicate with one another.

Packetized telephone peripheral 235 may include a digital signal processor (DSP) 245, a digital-to-analog (D/A) converter 250, an analog-to-digital (A/D) converter 255, a speaker 260 and a microphone 270. DSP 245 may perform functions, such as packet buffering, voice coding, equalization, and audio data processing. D/A converter 250 includes conventional circuitry for converting digital audio signals to analog signal form for output, for example, via speaker 260. Speaker 260 includes a conventional mechanism for providing an auditory output of the D/A converted audio signals. A/D converter 255 includes conventional circuitry for sampling and converting analog audio input signals from microphone 270 to digital signal form. Microphone 270 includes a conventional mechanism for converting auditory input into analog signals.

Exemplary Hub Device

Figure 3:
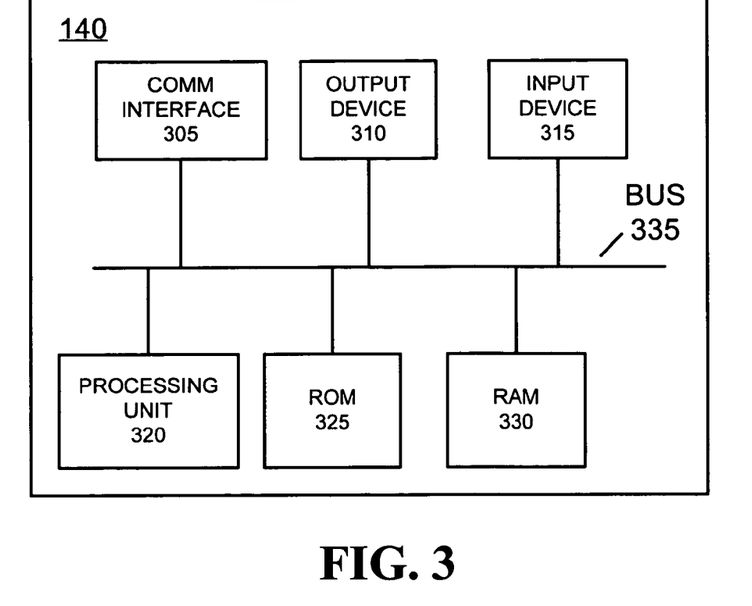
FIG. 3 illustrates exemplary components of a hub device consistent with the present invention.

FIG. 3 illustrates an exemplary hub device 140, which is configured to process packets received from computer 102, consistent with the present invention. Hub device 140 includes a communication interface 305, an output device 310, an input device 315, a processing unit 320, a ROM 325, a RAM 330, and a bus 335.

Communication interface 305 includes conventional mechanisms for connecting hub device 140 with network 135 and SS7 network 145. Output device 310 permits the output of data in video, audio, or hard copy format. Input device 315 permits entry of data into hub device 140 and includes a user interface (not shown). Processing unit 320 performs all data processing functions for inputting, outputting, and processing of data. ROM 325 provides permanent or semi-permanent storage of data and instructions for use by processing unit 320. RAM 330 provides semi-permanent working storage of data and instructions for use by processing unit 320. ROM 325 and RAM 330 may include large-capacity storage devices, such as a magnetic and/or optical recording medium and its corresponding drive. Bus 335 interconnects the various components of the hub device 140 to permit the components to communicate with one another.

Exemplary Document Processing

Figure 5:
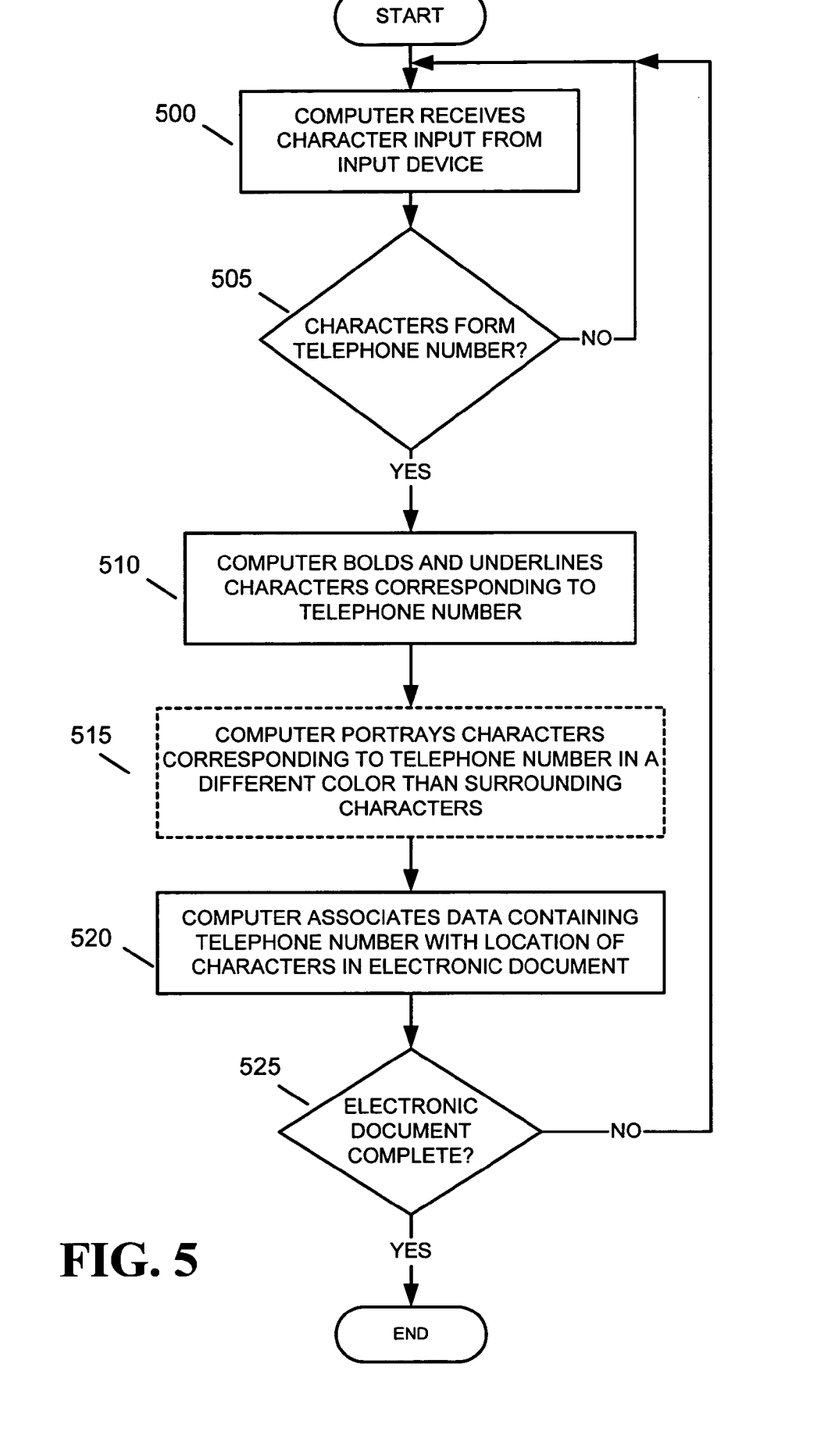
FIG. 5 is a flowchart that illustrates exemplary processing for identifying telephone numbers within an electronic document consistent with the present invention.

FIG. 5 is a flowchart that illustrates exemplary processing, consistent with the present invention, for identifying and highlighting telephones numbers within an electronic document. As one skilled in the art will appreciate, the method exemplified by FIG. 5 can be implemented as a sequence of instructions and stored in ROM 225 of computer 102 for execution by processing unit 205.

To begin processing, computer 102 receives character input from input device 210 [step 500]. The character input can be entered, for example, via a keyboard connected to computer 102. Computer 102 determines if any of the received characters form a telephone number, such as, for example, a 10-digit telephone number in the NXX-NXX-XXXX format prescribed by the North American Numbering Plan (NANP) [step 505]. If so, computer 102 bolds and underlines the characters in the electronic document corresponding to the telephone number [step 510]. If the received characters do not form a telephone number, processing returns to step 500.

Optionally, computer 102 may further portray characters corresponding to the telephone number in a different color than other surrounding characters [step 515]. For example, similar to hyper-text, computer 102 may portray the characters corresponding to the telephone number in a color blue. Computer 102 also associates data, containing the actual telephone number corresponding to the textual characters of the electronic document, with a location of the characters in the electronic document [step 520]. For example, if the textual characters representing the telephone number 444-555-6666 are positioned at location X through location Y in the electronic document, then data, in a format usable for setting up a telephone call, is associated with location X through location Y of the document. Computer 102 then determines if the electronic document is complete [step 525]. Document completion can be indicated, for example, if a user of the computer initiates a conventional "close document" operation. If the document is not complete, processing returns to step 500. If document completion is indicated, then processing ends.

Exemplary Call Set-Up Processing

Figure 6:
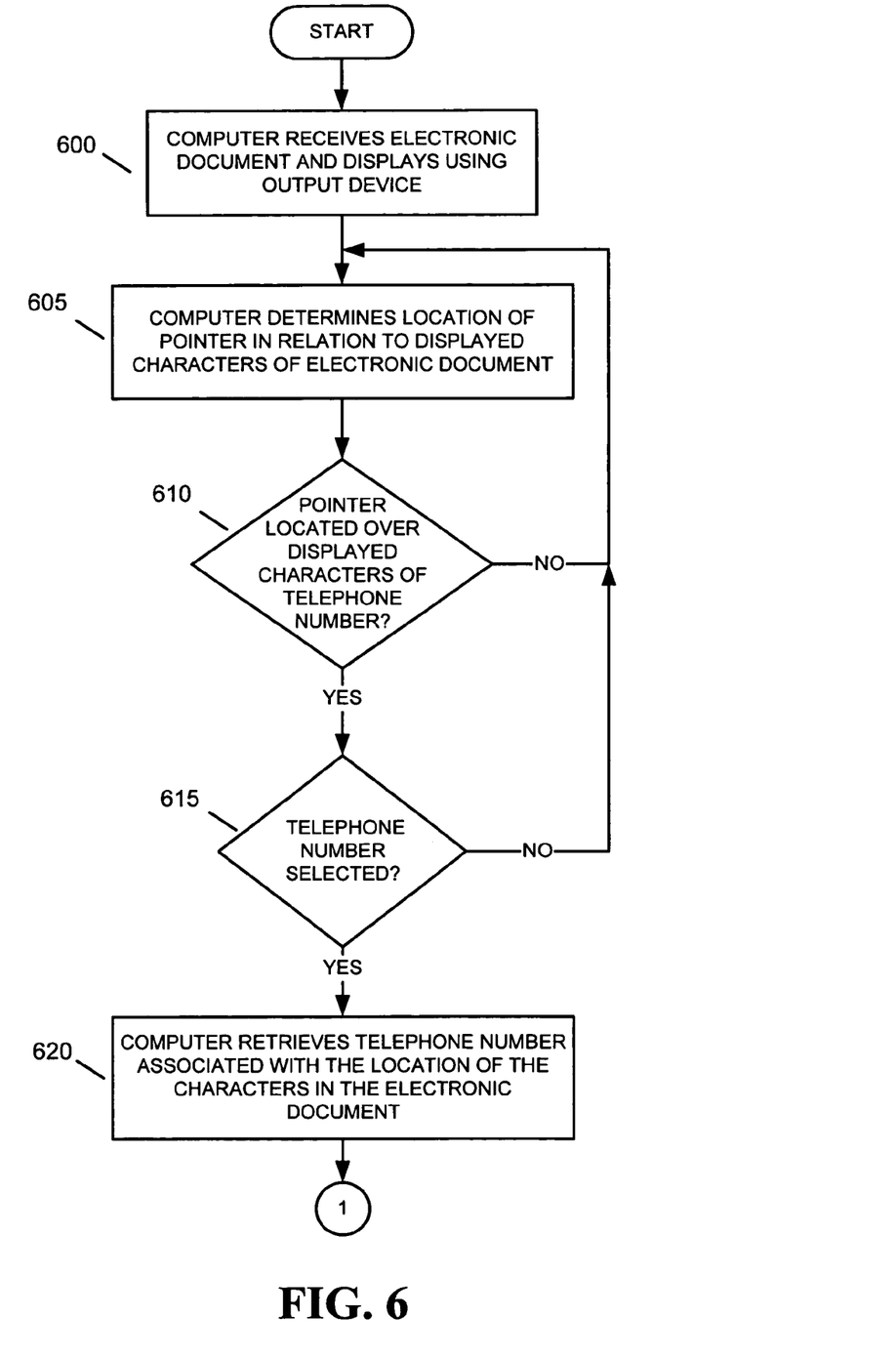
FIGS. 6–8 are flowcharts that illustrate exemplary system processing for setting up a connection between two telephones consistent with the present invention.
Figure 7:
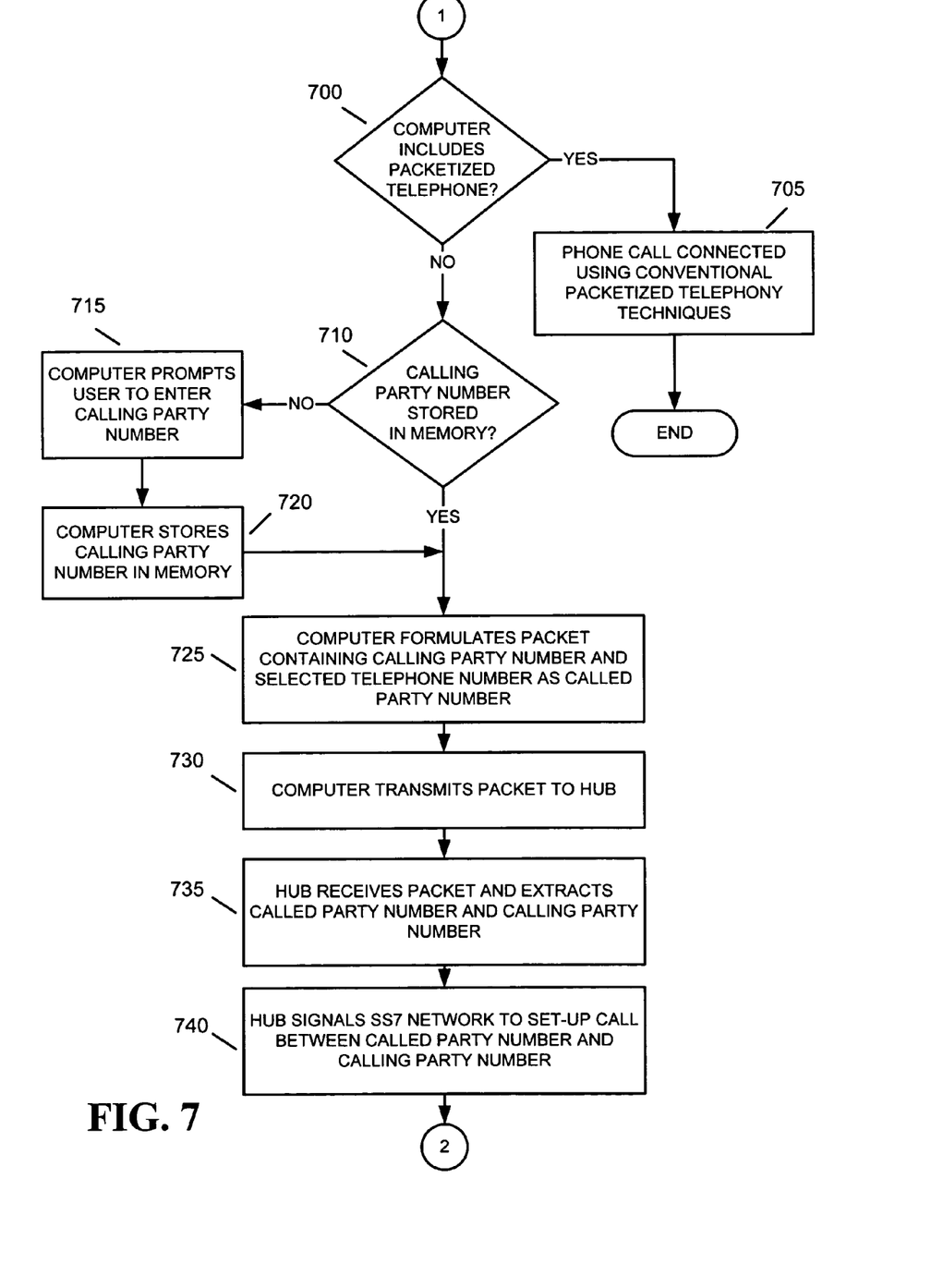
Figure 8:
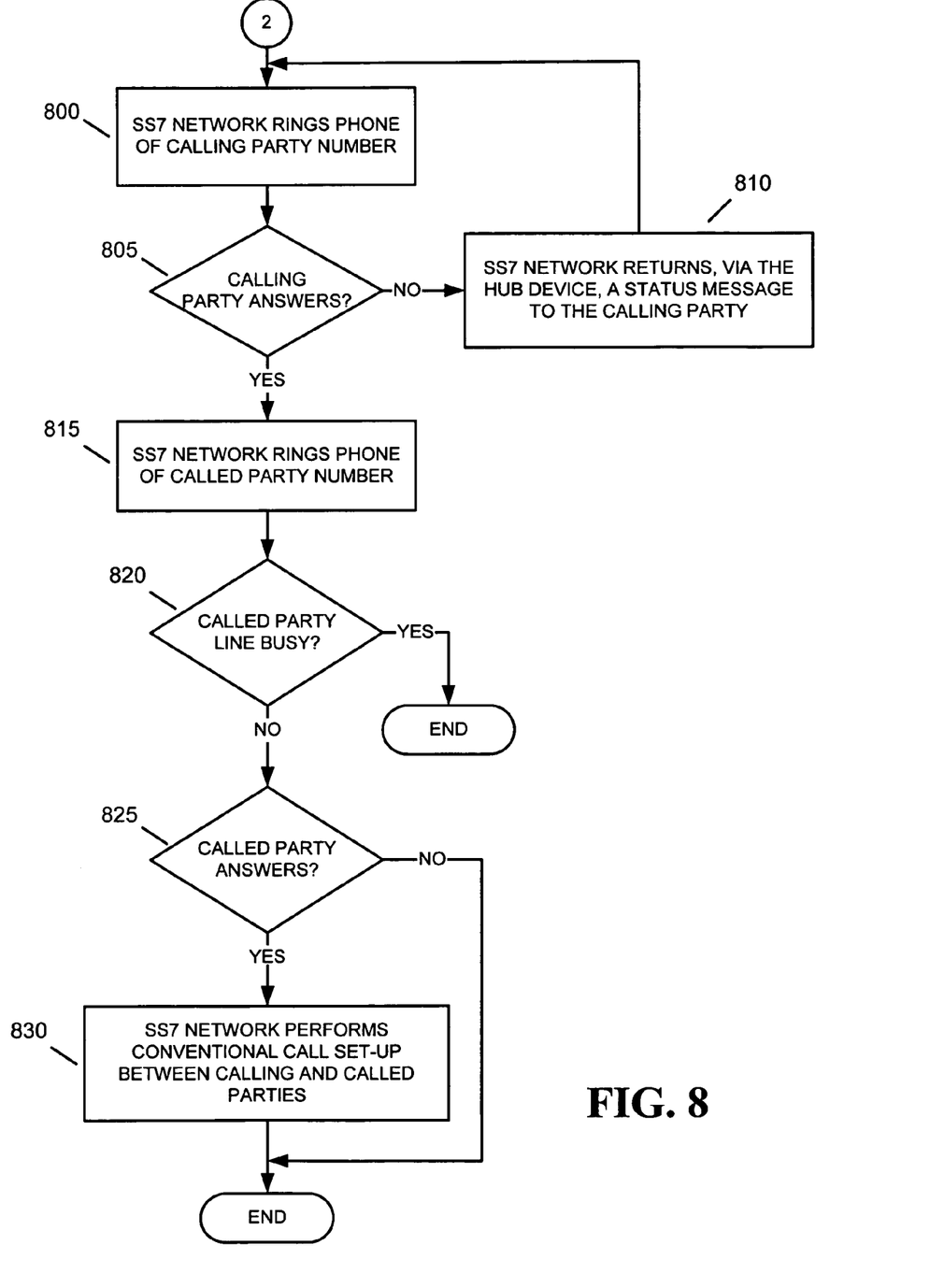

FIGS. 6–8 are flowcharts that illustrate exemplary processing, consistent with the present invention, for setting up a circuit-switched connection between, for example, telephone 152 and 156 or between telephone 152 and 150.

Figure 4:
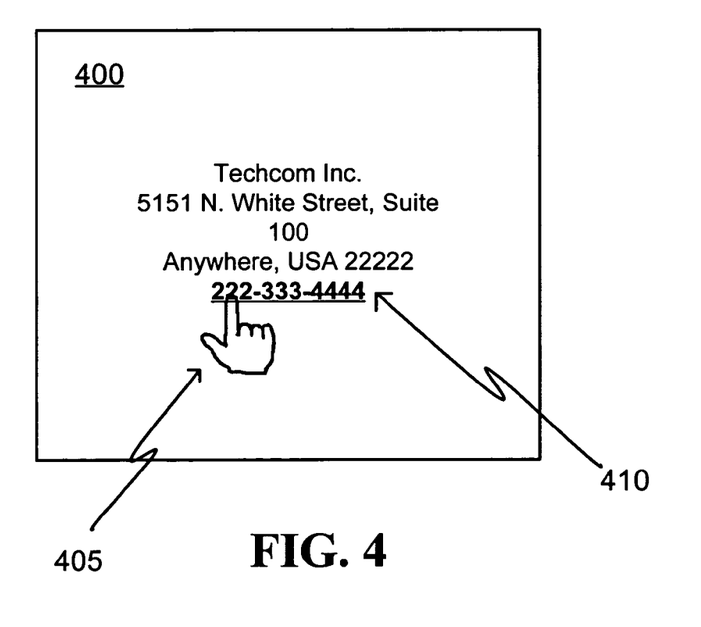
FIG. 4 illustrates a portion of an exemplary electronic document containing a 10 digit telephone number consistent with the present invention.

To begin processing, computer 102 receives an electronic document containing characters comprising one or more telephone numbers and displays the electronic document using output device 215 [step 600] (FIG. 6). Computer 102 then determines, using conventional techniques, a location of a pointer in relation to displayed characters of the electronic document [step 605]. After determination of the location of the pointer, computer 102 determines if the pointer is located over a telephone number displayed on output device 215 [step 610]. If not, processing returns to step 605. FIG. 4 illustrates a portion 400 of an exemplary electronic document containing a telephone number 410 consistent with the present invention. As shown, a user of computer 102 positions the "pointer" 405 over the telephone number using, for example, a conventional mouse.

If the pointer is located over a displayed telephone number, then computer 102 determines if the telephone number has been selected [step 615]. As an example, a user of computer 102 may select a telephone number by "clicking" a conventional mouse when the pointer is located over the displayed telephone number. If the telephone number has not been selected, processing returns to step 605. If the telephone number has been selected, computer 102 retrieves the data, containing the telephone number, associated with the location of the telephone number characters within the electronic document [step 620].

Computer 102 determines if it includes a packetized telephone peripheral, such as peripheral 235, among its active components [step 700]. (FIG. 7). If so, computer 102 sets up a packetized phone call with the called party using packetized telephone peripheral 235 and conventional packetized telephony techniques [step 705]. If computer 102 does not include a packetized telephone peripheral 235, computer 102 determines if a calling party number has been previously stored in memory [step 710]. If not, computer 102 prompts the user, via output device 215, for example, to enter a calling party number [step 715]. Computer 102 then stores the entered calling party number in RAM 220 [step 720].

Computer 102 formulates a packet containing the calling party number and the selected telephone number as the called party number [step 725]. Computer 102 transmits the formulated packet to hub device 140 via communication interface 230, central office 125 and network 135 [step 730].

Hub device 140 receives the packet and extracts the called party number and calling party number from the packet [step 735]. Hub device 140 then signals SS7 network 145 to set-up a call between a telephone associated with the called party number (e.g., telephone 150 or 156) and a telephone associated with the calling party number (e.g., telephone 152) [step 740].

In response to the signaling from hub device 140, SS7 network 145 rings telephone 152 associated with the calling party number [step 800] (FIG. 8). SS7 network 145 then determines if the calling party answers telephone 152 [step 805]. If the calling party does not answer telephone 152 after a specified period of time, SS7 network 145 returns, via hub device 140, a status message to computer 102 containing the calling party telephone number being rung and further containing possible reasons for failure of the call, along with associated remedies [step 810]. However, if the calling party does answer, SS7 network 145 rings telephone 150 or 156 associated with the called party number [step 815].

SS7 network 145 may then determine if the called party line 192 or 196 associated with telephone 150 or 156, respectively, is busy [step 820]. If, for example, the called party is associated with telephone 150, and computer 107 is already connected to central office 120 via telephone line 192, then line 192 will be busy and the call attempt will be unsuccessful. Typically, SS7 network 145 will return a "busy" signal to telephone 152. If, as another example, the called party is associated with telephone 156, and computer 105 is already connected to central office 130 via telephone line 196, then the call may still be connected to telephone 156 via DSL device 180 and bandwidth splitter 116.

SS7 network 145 may determine if the called party answers either telephone 150 or 156 [step 825]. If so, SS7 network 145 performs conventional call set-up between telephone 152, associated with the calling party number, and either telephone 150 or 156, associated with the called party number [step 830]. If the called party does not answer telephone 150 or 156, then the call fails and processing ends.

CONCLUSION

Systems and methods, consistent with the present invention, provide mechanisms that recognize telephone numbers among characters entered into an electronic document and permit a calling party to initiate a call with a party associated with the telephone number. The present invention, therefore, permits quick and easy establishment of a telephone call with a telephone associated with a telephone number contained in an electronic document using a computer input device, such as, for example a mouse.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other configurations may be possible. Additionally, the present invention is applicable to establishing calls via cell phones, Voice Over Internet Protocol (VoIP), video conferencing devices, or any combination thereof. Also, while series of steps have been described with regard to FIGS. 5–8, the order of the steps may be altered in other implementations. No element, step, or instruction used in the description of the present application should be construed as critical or essential to the invention unless explicitly described as such. The scope of the invention is defined by the following claims and their equivalents.

What is claimed is:

1. A method of making a telephone call using an electronic document stored in a computer having a user interface, the method comprising:
   retrieving the electronic document, the electronic document including data representing at least one telephone number;
   selecting a first telephone number from the electronic document by way of the user interface to obtain a selected telephone number;
   signaling, from the computer via a packet-switched network coupled to a first line, a telecommunication system to connect a call between a first telephone associated with the first telephone number and a second telephone associated with a calling party telephone number in response to the selection of the first telephone number, the calling party telephone number being stored in the computer, the call being connected via the first line;
   returning a status message to the computer if the calling party does not answer the second telephone within a specified time period wherein said status message comprises the calling party telephone number and possible reasons for failure of the call; and
   subsequent to attempting the call, using the stored calling party telephone number to connect all calls from the calling party to any telephone number including the selected telephone number.

2. The method of claim 1, wherein the selecting a first telephone number further comprises:
   selecting the telephone number from the electronic document using a mouse.

3. The method of claim 1, wherein the electronic document comprises at least one of an e-mail, a word processing file and a web page.

4. The method of claim 1 wherein the call is connected across a circuit-switched network and wherein said status message further comprises remedies for the failure.

5. The method of claim 1, wherein the call is connected across a packet-switched network.

6. The method of claim 1, wherein the second telephone is coupled to the first line via a bandwidth splitter.

7. The method of claim 1, wherein the computer is coupled to the first line via a modem.

8. The method of claim 7, wherein the modem is a digital subscriber line (DSL) modem.

9. The method of claim 7, wherein the computer is further coupled to the first line via a bandwidth splitter.

10. The method of claim 1, wherein the call is further connected via a second line coupled to the first telephone.

11. The method of claim 10, wherein the first telephone is coupled to the second line via a bandwidth splitter.

12. The method of claim 1, wherein the second telephone is a component of the computer.

13. A system, comprising:
   a telephony device coupled to a telephone line;
   a computer coupled to the telephone line, the computer having a user interface and comprising:
      an input device,
      at least one processor configured to:
         receive an electronic document that includes data representing a telephone number,
         receive input via the input device selecting the telephone number from the electronic document by way of the user interface, and
         signal, via a packet-switched network coupled to the telephone line, a telecommunication system to connect a call between a telephone associated with the telephone number and the telephony device in response to the selection of the telephone number, the call being connected via the telephone line,
      means for storing a calling party telephone number associated with the telephony device in the computer to obtain a stored calling party telephone number,
      means for returning a status message to the computer if the calling party does not answer the telephony device within a specified time period wherein said status message comprises the calling party telephone number and possible reasons for failure of the call; and
      means for using the stored calling party telephone number to connect all calls from the telephony device to any telephone number including the telephone number, subsequent to attempting the call.

14. The system of claim 13, wherein the telephony device is coupled to the telephone line via a bandwidth splitter.

15. The system of claim 13, wherein the computer is coupled to the telephone line via a modem.

16. The system of claim 15, wherein the modem is a digital subscriber line (DSL) modem.

17. The system of claim 15, wherein the computer is further coupled to the telephone line via a bandwidth splitter.

18. The system of claim 13, wherein the call is further connected via a second line coupled to the telephone.

19. The system of claim 18, wherein the telephone is coupled to the second line via a bandwidth splitter.

20. A computer-readable medium containing instructions for controlling at least one computer processor having a user interface to perform a method of making a telephone call using an electronic document, the method comprising:
   receiving an electronic document that includes data representing at least one telephone number;
   receiving input via an input device selecting through the user interface a first telephone number from the electronic document thereby providing a selected telephone number;
   signaling, via a packet-switched network coupled to a first line, a telecommunication system to connect a call between a first telephone associated with the first telephone number and a second telephone associated with a calling party telephone number in response to the selection of the first telephone number, the calling party telephone number being stored in the computer, the call being connected via the first line;
   returning a status message to the computer if the calling party does not answer the second telephone within a specified time period wherein said status message comprises the calling party telephone number and possible reasons for failure of the call; and
   subsequent to attempting the call, using the stored calling party telephone number to connect all calls from the calling party to any telephone number including the selected telephone number.

21. A method of making a telephone call using an electronic document stored in a computer having a user interface, comprising:
   retrieving the electronic document, the electronic document including data representing at least one telephone number;
   selecting a first telephone number from the electronic document by way of the user interface;
   signaling, from the computer via a packet-switched network coupled to a first line, a telecommunication system to connect a call between the first telephone number and a calling party telephone number in response to the selection of the first telephone number, the calling party telephone number being stored in the computer;
   establishing, via the first line, a circuit-switched connection between a first telephone associated with the first telephone number and a second telephone associated with the calling party telephone number wherein the second telephone is a component of the computer;
   subsequent to attempting the call, returning a status message to the computer if the calling party does not answer the second telephone within a specified time period wherein said status message comprises the calling party telephone number and possible reasons for failure of the call; and
   subsequent to attempting the call, using the stored calling party telephone number to connect all calls from the calling party to any telephone number including the first telephone number.

22. The method of claim 21, wherein the selecting a first telephone number further comprises:
   selecting the telephone number from the electronic document using a mouse.

23. The method of claim 21, wherein the electronic document comprises at least one of an e-mail, a word processing file and a web page.

24. The method of claim 21 said status message further comprising remedies for the failure.

25. The method of claim 21, wherein the circuit-switched connection between the first telephone the second telephone is further connected via a second line coupled to the first telephone.

26. The method of claim 25, wherein the first telephone is coupled to the second line via a bandwidth splitter.

27. A system comprising:
   a telephony device of a calling party coupled to a first telephone line; and
   a computer having a user interface coupled to the first telephone line, the destination number of the telephony device being stored in the computer, the computer comprising:
      an input device,
      at least one processor configured to:
         receive an electronic document that includes data representing a telephone number,
         receive input via the input device selecting the telephone number from the electronic document by way of the user interface, and
         initiate the establishment of a circuit-switched connection between a telephone associated with the telephone number and the telephony device via the first telephone line,
         return a status message to the computer if the calling party does not answer the telephony device within a specified time period wherein said status message comprises the destination number of the telephony device and possible reasons for failure of the call; and
      means for using the stored destination number to connect all calls from the telephony device to any telephone number including the selected telephone number, subsequent to attempting the connection.

28. The system of claim 27, wherein the telephony device is coupled to the first telephone line via a bandwidth splitter.

29. The system of claim 27, wherein the computer is coupled to the first telephone line via a modem.

30. The system of claim 29, wherein the modem is a digital subscriber line (DSL) modem.

31. The system of claim 29, wherein the computer is further coupled to the first telephone line via a bandwidth splitter.

32. The system of claim 27, wherein the call is further connected via a second telephone line coupled to the telephone.

33. The system of claim 32, wherein the telephone is coupled to the second telephone line via a bandwidth splitter.

34. A computer-readable medium containing instructions for controlling at least one computer processor having a user interface to perform a method of making a telephone call using an electronic document, the method comprising:
   receiving an electronic document that includes data representing at least one telephone number;
   receiving input via an input device selecting a first telephone number from the electronic document by way of the user interface;
   signaling, via a packet-switched network coupled to a first line, a telecommunication system to connect a call between the first telephone number and a calling party telephone number in response to the selection of the first telephone number, the calling party telephone number being stored in the computer;

establishing, via the first line, a circuit-switched connection between a first telephone associated with the first telephone number and a second telephone associated with the calling party telephone number;

returning a status message to the computer if the calling party does not answer the second telephone within a specified time period wherein said status message comprises the calling party telephone number and possible reasons for failure of the call; and subsequent to attempting the call, using the stored calling party telephone number to connect all calls from the calling party to any telephone number including the first telephone number.

35. The computer readable medium of claim 34 wherein the status message further comprises remedies for the failure.

36. A system for making a telephone call using an electronic document stored in a computer having a user interface, the system comprising:

means for receiving the electronic document, the electronic document including data representing at least one telephone number;

means, utilizing the user interface, for selecting a first telephone number from the electronic document to obtain a selected telephone number;

means for signaling, via a packet-switched network coupled to a first line, a telecommunication system to connect a call between a first telephone associated with the first telephone number and a second telephone associated with a calling party telephone number in response to the selection of the first telephone number, the calling party telephone number being stored in the computer, the call being connected via the first line;

means for returning a status message to the computer if the calling party does not answer the second telephone within a specified time period wherein said status message comprises the calling party telephone number and possible reasons for failure of the call; and means for using the stored calling party telephone number to connect all calls from the calling party to any telephone number including the selected telephone number, subsequent to attempting the call.

37. The system of claim 36 wherein the status message further includes remedies for the failure.

38. A computer-readable medium containing instructions for controlling at least one computer processor having a user interface to perform a method of making a telephone call using an electronic document, the method comprising:

receiving an electronic document that includes data representing at least one telephone number;

receiving input via an input device selecting through the user interface a first telephone number from the electronic document thereby providing a selected telephone number;

signaling, via a packet-switched network coupled to a first line, a telecommunication system to connect a call between a first telephone associated with the first telephone number and a second telephone associated with a calling party telephone number in response to the selection of the first telephone number, the calling party telephone number being stored in the computer, the call being connected via the first line;

wherein the calling party telephone number is stored in the computer and the status message comprises the calling party telephone number and possible reasons for failure of the call, and subsequent to attempting the call, using the stored calling party telephone number to connect all calls from the calling party to any telephone number including the selected telephone number and returning a status message to the computer if the calling party does not answer the second telephone within a specified time period.

39. The computer readable medium of claim 38 wherein the status message further includes remedies for the failure.

40. A method of making a telephone call using an electronic document stored in a computer having a user interface, comprising:

retrieving the electronic document, the electronic document including data representing at least one telephone number;

selecting a first telephone number from the electronic document by way of the user interface;

signaling, from the computer via a packet-switched network coupled to a first line, a telecommunication system to connect a call between the first telephone number and a calling party telephone number in response to the selection of the first telephone number, the calling party telephone number being stored in the computer;

establishing, via the first line, a circuit-switched connection between a first telephone associated with the first telephone number and a second telephone associated with the calling party telephone number; and subsequent to attempting the call, using the stored calling party telephone number to connect all calls from the calling party to any telephone number including the first telephone number and returning a status message to the computer if the calling party does not answer the second telephone within a specified time period wherein said status message comprises the calling party telephone number and possible reasons for failure of the call.

41. The method of claim 40 wherein the status message includes remedies for the failure.

* * * * *